March 11, 1958 — W. E. BURNS — 2,826,306
WATER-ORGANIC SEPARATOR TANK
Filed Sept. 10, 1953 — 3 Sheets-Sheet 1

INVENTOR.
W. E. BURNS
BY Hudson and Young
ATTORNEYS

INVENTOR.
W. E. BURNS

INVENTOR.
W. E. BURNS

United States Patent Office 2,826,306
Patented Mar. 11, 1958

2,826,306

WATER-ORGANIC SEPARATOR TANK

William E. Burns, Pasadena, Tex., assignor to Phillips Petroleum Company, a corporation of Delaware Application September 10, 1953, Serial No. 379,350

9 Claims. (Cl. 210—114)

This invention relates to the separation of substantially immiscible liquids. In one aspect this invention relates to the separation of substantially immiscible liquids having different specific gravities. In another aspect this invention relates to the separation of one liquid having a relatively low specific gravity from another liquid having a relatively high specific gravity. In another aspect this invention relates to a method for the separation of two substantially immiscible liquids wherein the rate of flow of each of said liquids through a separation zone is substantially independent of the rate of flow of the other of said liquids. In another aspect this invention relates to a method for the separation of two substantially immiscible liquids wherein the volume of each liquid within a separation zone can be controlled. In another aspect this invention relates to a method for the separation of two substantially immiscible liquids wherein only a small volume of one of said liquids is maintained within a separation zone. In another aspect this invention relates to apparatus for the separation of two substantially immiscible liquids. In another aspect this invention relates to separator apparatus having adjustable means for varying the volume of each of two substantially immiscible liquids within said separator apparatus. In still another aspect this invention relates to separation means wherein the level of one liquid in a separation zone is varied in accordance with the level of said liquid in a succeeding zone.

In the operation of chemical plants, oil refineries and other processing plants, large volumes of water are used for cooling and processing purposes. In some of these operations, particularly in cooling operations, the water is used on a "once through" basis. That is, it is pumped from a source of water such as a natural bay, river, etc., through heat exchange tubes or jackets in the equipment to be cooled and returned to said source at a point removed from the intake point. During the circulation of the water through the plant, it becomes contaminated with oil, chemicals or other immiscible and/or insoluble contaminants. If such contaminated water is returned to the source, there is created an undesirable pollution problem, as well as a loss of more or less valuable oils and/or chemicals. In other cooling operations the water is pumped from an artificial pond, through the equipment to be cooled and returned to said pond. In such instances the contaminants picked up by the water separate therefrom and accumulate in said pond unless independent separation means are provided. In other of these operations, particularly in some processing operations, the water is frequently injected directly into the processing operation at some point as a quench, wash, extraction medium, etc. In such instances the injected water generally must be separated from the final product. In all of these operations it is desirable for economic reasons to effect the most efficient separation.

Such a separation as that described becomes difficult when the volume of one of the liquids to be separated is small compared to the volume of the other liquid. When one of the liquids to be separated is costly, it is desirable to maintain the smallest volume possible in the separation apparatus. Likewise, when one of the liquids has a tendency to change chemically upon prolonged contact with the other liquid, it is desirable to reduce the volume, and thereby the residence time, of such a liquid in the separating apparatus to a minimum. Similarly, if one of the liquids has an inherent tendency to change chemically, e. g., to polymerize, it is desirable to isolate and maintain a minimum of such a liquid in the separating apparatus.

The prior art provides various methods and apparatus for the separation of substantially immiscible liquids. However, none of the prior art provides a method or apparatus for separating substantially immiscible liquids wherein provision is made for isolating the separated liquids in separate compartments, nor where the volume of either liquid can be maintained at a minimum, and where, once the operation is adjusted the ratio of flow of the different liquids are substantially independent of each other.

I have discovered that more efficient separation of substantially immiscible liquids can be accomplished when the relative volumes of said liquids in a separation zone are controlled in accordance with the level of one of said liquids in a succeeding zone.

According to this invention, there is provided a method of separating substantially immiscible liquids which comprises passing a mixture of said liquids into a gravity separation zone wherein said liquids separate to form an interface, passing said separated liquids into separate succeeding zones, and controlling the level of said interface in accordance with the level of the heavier of said liquids in its said separate zone.

Also according to this invention, there is provided a separator chamber for separating substantially immiscible liquids which is comprised of a gravity separation compartment the downstream side of which is defined by a first weir of fixed height, a light liquid compartment downstream from said gravity separation compartment, and a heavy liquid compartment downstream from said light liquid compartment, the downstream side of said heavy liquid compartment being defined by a second weir of a height less than, but adjustable relative to, the height of said first weir.

Figure 1:
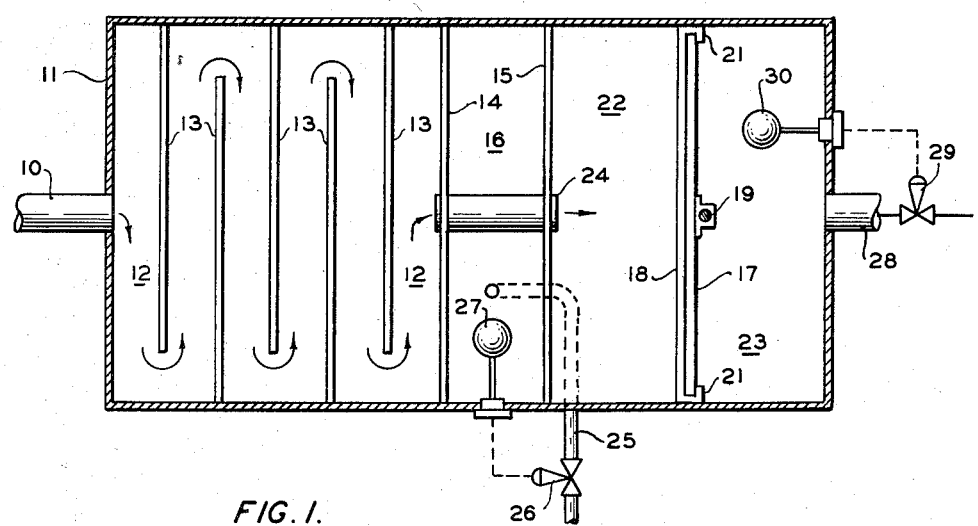
Figure 1 is a plan view, partly in section, of one form of apparatus which can be used to carry out the method of the invention.
Figure 2:
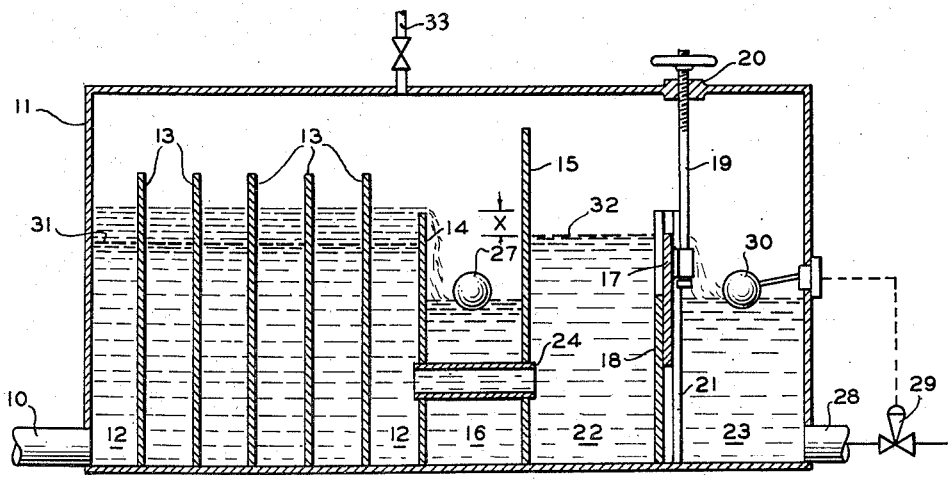
Figure 2 is a side elevation view, partly in section, of the apparatus shown in Figure 1.

Referring to the drawings, in Figures 1 and 2, there is illustrated diagrammatically a separation chamber 11 having inlet means 10 for introducing a mixture of substantially immiscible liquids into a gravity separation compartment 12. A plurality of transverse baffles 13 secured to the bottom and alternate sides of said compartment, in spaced relationship with each other, extend partially across said compartment so as to provide a tortuous path for the flow of liquids therethrough. Said baffles can be of any convenient height relative to the overall dimensions of said chamber. Spaced apart downstream from the last of said baffles 13 is a first weir 14 secured to the bottom and opposite side walls of chamber 11. Said weir 14 which has a height less than that of the last baffle 13 serves as the downstream wall of gravity separation compartment 12. Spaced apart downstream from said weir 14 is a partition 15 secured to the bottom and side walls of chamber 11. Partition 15 which has a height preferably greater than that of weir 14 serves as the downstream wall of, and defines, together with the side walls of chamber 11, and the weir 14, light liquid compartment 16. Spaced apart downstream from said partition 15 is a second weir having a top section 17 and a lower section 18. Said lower section 18 is secured to the bottom and side walls of chamber 11. Said top section 17 is movable vertically by means of threaded rod 19 attached thereto and extending through bonnet 20 and is held slidably adjacent to lower section 18 by means of suitable channels 21. Said weir sections 17 and 18 serve as the downstream wall and define, together with the side walls of chamber 11 and partition 15, a first heavy liquid compartment 22. A second heavy liquid compartment 23 downstream and adjacent to compartment 22 is defined by weir sections 17 and 18, and the walls of chamber 11. Conduit 24 provides for the passage of heavy liquid from compartment 12 to compartment 22.

Light liquid is withdrawn from compartment 16 through conduit 25 controlled by motor valve 26 actuated by float level control 27. Heavy liquid is withdrawn through conduit 28 controlled by motor valve 29 actuated by float level control 30. If desirable or necessary the pressure in chamber 11 can be controlled by pressure relief valve and vent 33. Said pressure relief valve can be set to relieve at a predetermined pressure or can be controlled in accordance with operating conditions of the system in which the separator chamber is employed. Suitable means (not shown) can be provided for draining said chamber when necessary or desirable.

In operation a mixture of two substantially immiscible liquids having different specific gravities is introduced through conduit 10 into gravity separation compartment 12 of separator vessel 11. Said mixture flows around baffles 13 as shown by the arrows in Figure 1, during which time a gravity separation occurs and the lighter of the liquids rises and floats on top of the heavy liquid forming interfacial level 31. The separated lighter liquid overflows weir 14 into compartment 16 from which it is withdrawn through conduit 25. The level in compartment 16 is controlled by float level controller 27 which actuates motor valve 26. The separated heavier liquid flows through conduit 24 into compartment 22 and overflows weir section 17 into compartment 23 from which it is withdrawn through conduit 28. The level in compartment 23 is controlled by float level controller 30 which actuates motor valve 29.

When liquid is overflowing weir section 17, and liquid is overflowing weir 14, the interface 31 is established at a point depending upon (1) the difference between the height of weir 14 and weir section 17 and (2) the specific gravity of the two liquids. Since the weight of a column of liquid in compartment 12 must equal the weight of a column of liquid in compartment 22, these same factors determine the amount of light liquid floating on top of the heavy liquid in compartment 12. In other words, the interface 31 will establish itself at a point below the level 32 by an amount directly proportional to the difference of the specific gravities of the two liquids and dependent upon the difference in height between the two weirs 14 and 17. As the height of weir 17 approaches the height of weir 14 the amount of light liquid flowing on the heavier liquid in compartment 12 becomes less.

Figure 3:
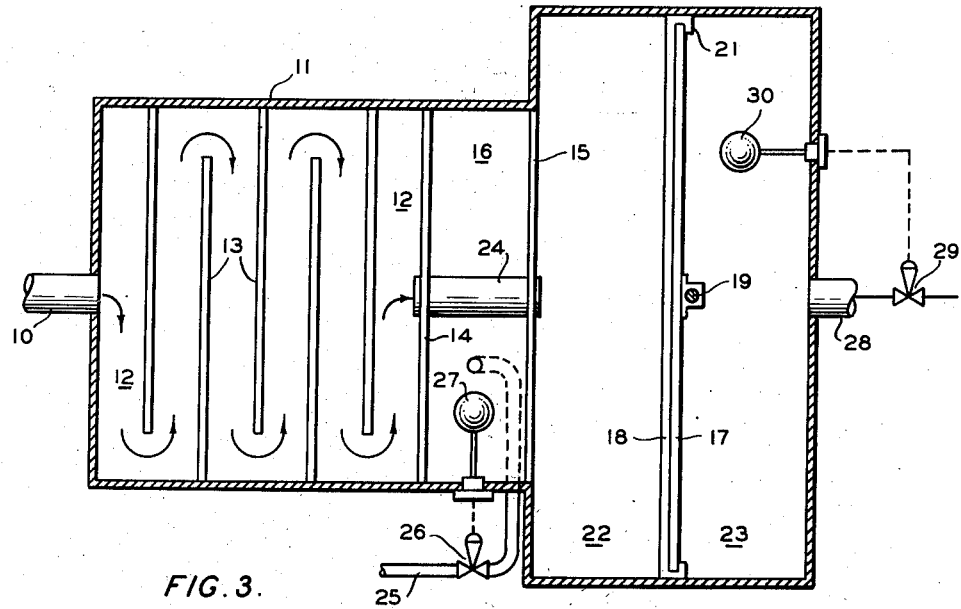
Figure 3 is a plan view, partly in section, of another form of apparatus that may be used to carry out this invention.

Figure 3 illustrates in diagrammatic form another embodiment of the invention which provides for a greater effective length of weir section 17 relative to the effective length of weir 14. The operation of this embodiment is the same as that described for the embodiment shown in Figures 1 and 2. The relation between the effective lengths of weir 14 and weir section 17 is discussed below.

Figure 4:
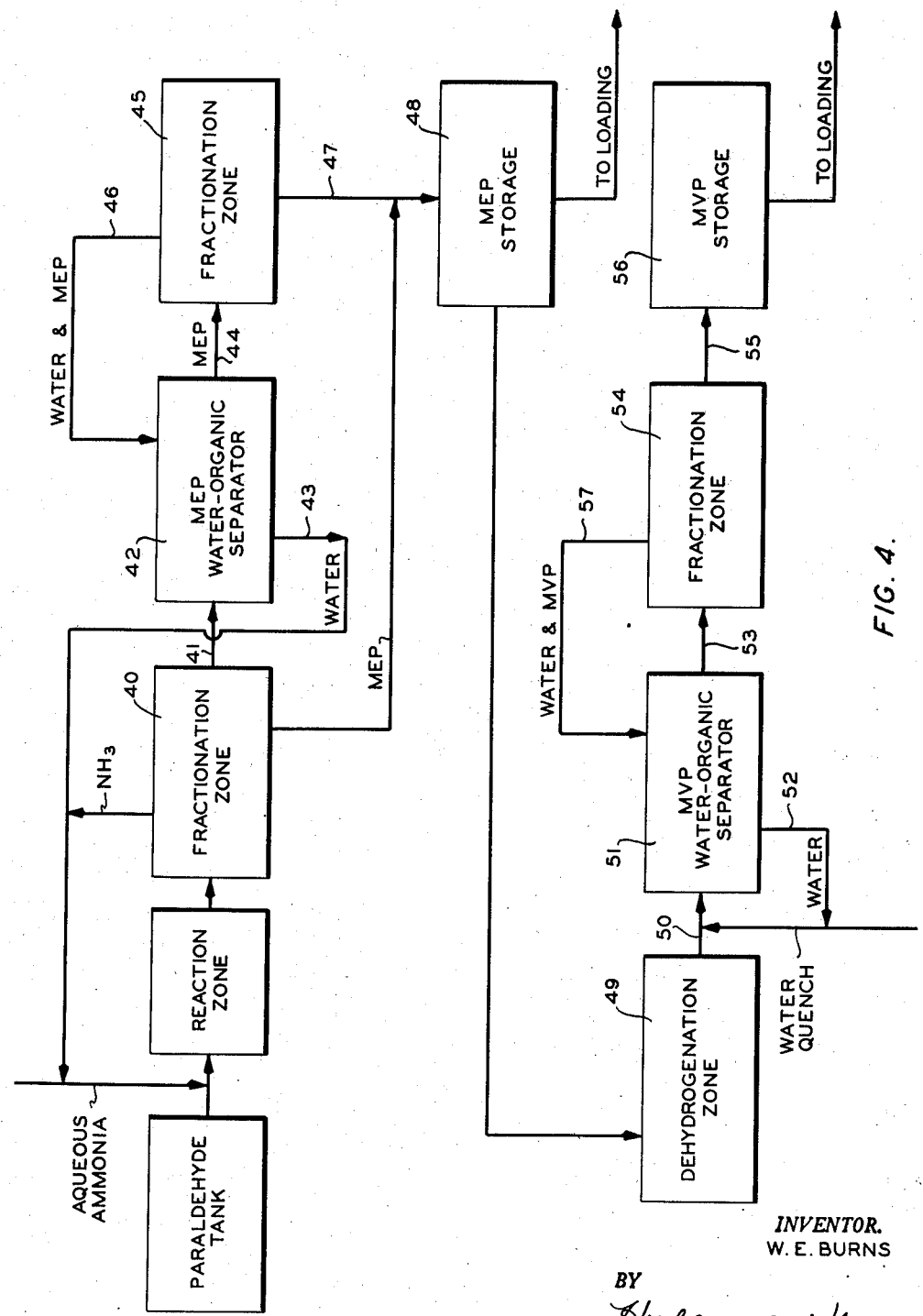
Figure 4 is a diagrammatic flow sheet illustrating the employment of the invention in the manufacture of methyl ethyl pyridine and methyl vinyl pyridine.

Figure 4 illustrates in diagrammatic form the employment of the invention in a plant for the manufacture of methyl ethyl pyridine and methyl vinyl pyridine. A mixture of methyl ethyl pyridine and water is removed from fractionation zone 40 through line 41 into separator 42 wherein a separation between the organic liquid and water is effected as described above. Water is withdrawn from separator 42 through line 43 and recycled as shown. Methyl ethyl pyridine is passed from separator 42 through line 44 to fractionation zone 45 from which a mixture of water and methyl ethyl pyridine is removed overhead through line 46 and returned to separator 42. Dry, purified methyl ethyl pyridine is withdrawn through line 47 to storage tank 48. Methyl ethyl pyridine is dehydrogenated in dehydrogenation zone 49 and the reaction product, methyl vinyl pyridine, is quenched with water at 50. The resulting mixture is passed to separator 51 wherein a separation between the organic liquid and water is effected as described above. Water is withdrawn from separator 51 through line 52 and recycled as shown. Wet, impure methyl vinyl pyridine is withdrawn from separator 51 through line 53 to fractionation zone 54 from which dry, pure methyl vinyl pyridine is passed through line 55 to storage tank 56. A stream of water and methyl vinyl pyridine is removed overhead from fractionation zone 54 through line 57 and recycled to separator 51. For simplification, only one separator 51 is shown as serving both dehydrogenation zone 49 and fractionation zone 54. In actual practice, if desired, an individual separator can be employed for each zone. Separators 42 and 51 were constructed in accordance with the invention.

Figure 5:
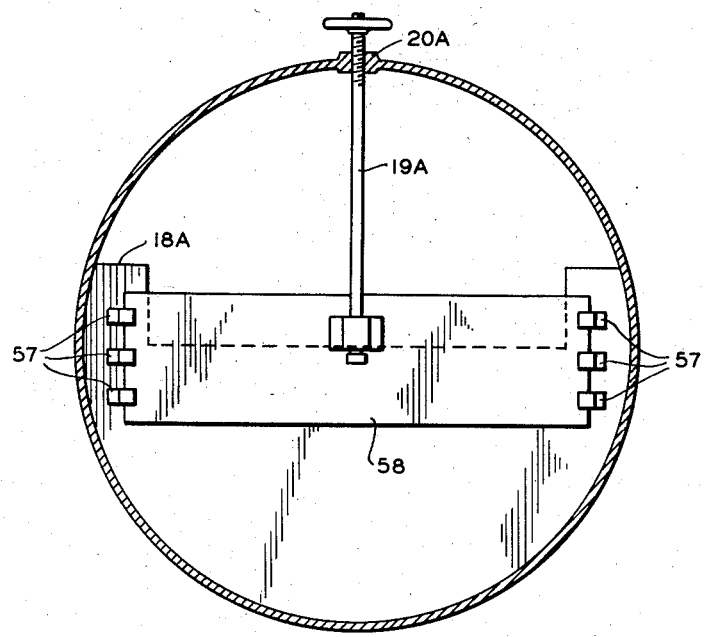
Figure 5 is an end view, in section, showing an adjustable weir in a cylindrical apparatus.

Figure 5 is an end view showing a weir that can be used in the invention when using a cylindrical apparatus. This weir can be adjusted for height in a horizontal cylindrical vessel. The operation of this weir is similar to that described under Figure 2. Section 58 is movable vertically by means of threaded rod 19A attached thereto and extending through bonnet 20A and is held slidably adjacent to lower section 18A by means of suitable channels 57.

*Example I*

A substantially cylindrical vessel approximately seven feet in diameter, constructed in accordance with the invention, was employed for the separation of a mixture of methyl ethyl pyridine and water. It was found that a completely satisfactory separation between the two liquids could be effected. The layer or organic chemical floating on top of the water in the gravity separation compartment was approximately 6 inches thick. The height of the water overflow weir was 66.0 inches and the height of the pyridine overflow weir was 66.38 inches. The specific gravity of the organic chemical phase was 0.90 and the specific gravity of the water phase was 0.96.

*Example II*

A substantially cylindrical vessel approximately 10 feet in diameter, constructed in accordance with the invention, was employed to effect a completely satisfactory separation of a mixture of methyl vinyl pyridine and water. The layer or organic chemical floating on top of the water in the gravity separation compartment was approximately 3 inches thick. The height of the water overflow weir was 90.0 inches and the height of the pyridine overflow weir was 90.12 inches. The specific gravity of the organic chemical phase was 0.92 and the specific gravity of the water phase was 0.96.

From the heights of the weirs in both the above examples, it can be seen that the pyridine layer was maintained in the smaller upper portion of the separation chamber, thus, further reducing the inventory of the expensive organic chemical in the apparatus.

In the above examples it was desirable to maintain the minimum volume of the lighter liquid in the separator. The invention can also be utilized when it is desirable to maintain a minimum volume of the heavier of two immiscible liquids in the separator. In such instances the conduit 24 which extends through weir 14 and partition 15 (Figure 2) is placed at or near the bottom of the chamber and the height of weir section 17 is made much less than that of weir 14.

For example, the invention can be employed as a catalyst separator in those processes which employ a heavy liquid catalyst such as hydrofluoric acid or aluminum chloride-hydrocarbon complex.

*Example III*

A mixture of hydrocarbons and HF catalyst is withdrawn from a reaction zone wherein isobutane is alkylated with a mixture of butenes and passed to a separator chamber constructed in accordance with the invention. The heavier catalyst settles to the bottom of the gravity separation compartment where, due to the comparatively great difference between the height of the hydrocarbon overflow weir (14 in Figure 2) and the height of the catalyst overflow weir (17 in Figure 2), a minimum volume of said catalyst is maintained.

The embodiment of the invention illustrated in Figures 1 and 2 is represented as being rectangular in shape. However, vessels of other shapes can be employed. One particularly useful embodiment of the invention comprises a substantially cylindrical vessel having the same arrangement of compartments, baffles, partitions, weirs, etc., as that described for the embodiment illustrated in Figures 1 and 2. As illustrated in Example II above, the embodiment employing a substantially cylindrical vessel is especially valuable in those instances wherein one of the liquids to be separated has a tendency to polymerize upon standing. As mentioned above, by proper adjustment of the several weir heights to take advantage of the vessel shape, the volume of the polymerizable liquid within the separator can be maintained at an absolute minimum.

It is within the scope of the invention for the separation chamber to comprise a rectangular gravity separation compartment and cylindrical light and heavy liquid compartments or vice versa. It is also within the scope of the invention for the several compartments to be non-adjacent and connected to each other by suitable conduits.

In Figures 1 and 2, the adjustable weir was illustrated as being rectangular in shape, of two sections and extending entirely across the chamber. Obviously, it would be within the scope of the invention to employ weirs of different shapes and different effective lengths. For example, the said weir could comprise a partition with a center section of adjustable height or two side sections of adjustable height serving as the effective length of the weir.

Also, it is within the scope of the invention to provide for both of the described weirs to be adjustable in height relative to each other. In such instances at least a fine adjustment in effective weir heights can be made at the upstream weir (weir 14 in Figure 2).

As mentioned above, the invention provides a method and apparatus for the separation of substantially immiscible liquids which, once adjusted, will operate substantially independently of the several liquid flow rates. After determining the height of weir 17 in relationship to the height of weir 14, weir 17 can be fixed in place. The invention has been described assuming normal fluctuations of the several liquid flow rates. However, in those instances where unusually large fluctuations in the flow rate of the heavier liquid are encountered, the embodiment of the invention illustrated in Figure 3 is preferable.

As the flow of liquid over a weir increases, the "head over the weir" increases the effective height of the weir. Therefore, an abnormal increase in the volume of heavy liquid passing through the apparatus of Figure 2 would result in an increase in the effective height of weir section 17. This could result in raising the interface 31 to a point where there would be danger of heavy liquid spilling over weir 14 into light liquid compartment 16. This danger can be mitigated by increasing the effective length of weir section 17 relative to that of weir 14 as shown in Figure 3. An increase in "head over the weir" resulting in an increase in the effective height of weir section 17 would still result in a corresponding rise of the interface 31. However, the greater effective length of weir section 17 will accommodate all but the most abnormal increases in heavy liquid flow.

The embodiment illustrated in Figure 3 is especially valuable when separating liquids of extremely close specific gravity. In such instances the location of the interface in the gravity separation compartment changes radically with any change in the effective height of the heavy liquid overflow weir (weir section 17).

Reasonable variation and modification are possible within the scope of the above specification, the drawings, and the appended claims to the invention, the essence of which is a method and apparatus for the separation of substantially immiscible liquids which comprises separation of said liquids in a gravity separation zone to form an interface therein, passing said separated liquids into separate zones, and controlling the level of said interface in accordance with the level of the heavier of said liquids in its said separate zone.

I claim:

1. Apparatus for the separation of substantially immiscible liquids which comprises a separation vessel having: a gravity separation compartment defined by the walls of said vessel and a first weir of fixed height extending transversely across said vessel; a plurality of transverse baffles extending alternately from opposite side walls and partially across said compartment; a light liquid compartment downstream from and adjacent to said gravity-separation compartment and defined by said first weir, the walls of said vessel and a partition extending transversely across said vessel; a first heavy liquid compartment downstream from said gravity separation compartment and adjacent to said light liquid compartment and defined by said partition, the walls of said vessel and a second weir, said second weir having a height less than but variable relative to the height of said first weir; a second heavy liquid compartment downstream from and adjacent to said first heavy liquid compartment and defined by said second weir and the walls of said vessel; a conduit connecting said gravity separation compartment and said first heavy liquid compartment; and means for varying the height of said second weir.

2. Apparatus for the separation of substantially immiscible liquids which comprises a substantially cylindrical vessel having a pair of end walls and a cylindrical wall; a first upstream compartment defined by one of said end walls, said cylindrical wall, and a first weir secured to said cylindrical wall and extending transversely across said vessel; a plurality of transverse baffles in spaced relationship with each other in said first compartment secured to said cylindrical wall and extending alternately from opposite sides thereof partially across said compartment so as to provide a tortuous flow of liquid therethrough; said first weir having a fixed height less than that of said transverse baffle in closest proximity thereto; a second compartment downstream from and adjacent to said first compartment and defined by said first weir, said cylindrical wall and a transverse partition extending across said vessel and secured to said cylindrical wall; a conduit extending through said first weir and said partition; a third compartment downstream from said first compartment and adjacent to said second compartment and defined by said partition, said cylindrical wall and a second weir having a height less than but variable relative to the height of said first weir; means for varying the height of said second weir; a fourth compartment downstream from and adjacent to said third compartment and defined by said second weir, said cylindrical wall, and the other of said end walls; inlet means into said first compartment; outlet means from said second compartment controlled by level control means responsive to a liquid level therein; and outlet means from said fourth compartment controlled by level control means responsive to a liquid level therein.

3. Apparatus for the separation of substantially immiscible liquids which comprises a separation vessel having: a gravity separation compartment defined by the walls of said vessel and a first weir of fixed height extending transversely across said vessel; a light liquid compartment downstream from and adjacent to said gravity separation compartment and defined by said first weir, the walls of said vessel and a partition extending transversely across said vessel; a first heavy liquid compartment downstream from said gravity separation compartment and adjacent to said light liquid compartment and defined by said partition, the walls of said vessel and a second weir, said second weir having a height less than but variable relative to the height of said first weir; a second heavy liquid compartment downstream from and adjacent to said first heavy liquid compartment and defined by said second weir and the walls of said vessel; a conduit connecting said gravity separation compartment and said first heavy liquid compartment; and means for varying the height of said second weir.

4. An apparatus according to claim 3 wherein the effective length of said second weir is greater than that of said first weir.

5. An apparatus according to claim 3 wherein the effective length of said second weir is less than that of said first weir.

6. Apparatus for continuously separating substantially immiscible light and heavy liquids which is comprised of, in combination: a gravity separation compartment the downstream side of which is defined by a first weir of fixed height extending transversely across said compartment; a light liquid compartment positioned downstream from and adapted to receive light liquid from said gravity separation compartment; a heavy liquid compartment positioned downstream from and adapted to receive heavy liquid from said gravity separation compartment, the downstream side of said heavy liquid compartment being defined by a second weir having a height less than, but variable relative to the height of said first weir and extending transversely across said heavy liquid compartment; and means without said heavy liquid compartment and attached to said second weir for varying the height of said second weir during continuous operation of said apparatus.

7. Apparatus for the separation of substantially immiscible liquids which comprises a separation vessel having: a gravity separation compartment defined by the walls of said vessel and a first weir extending transversely across said vessel; a light liquid compartment downstream from and adjacent to said gravity separation compartment and defined by said first weir, the walls of said vessel and a partition extending transversely across said vessel; a first heavy liquid compartment downstream from said gravity separation compartment and adjacent to said light liquid compartment and defined by said partition, the walls of said vessel and a second weir, said second weir having a height less than but variable relative to the height of said first weir; a conduit connecting said gravity separation compartment and said first heavy liquid compartment; and means for varying the height of said second weir.

8. Apparatus for continuously separating substantially immiscible light and heavy liquids which is comprised of, in combination: a gravity separation compartment the downstream side of which is defined by a first weir of fixed height extending transversely across said compartment; a light liquid compartment positioned downstream from and adapted to receive light liquid from said gravity separation compartment; a heavy liquid compartment positioned downstream from and adapted to receive heavy liquid from said gravity separation compartment; a second weir of variable height defining the downstream side of and extending transversely across said heavy liquid compartment, said second weir having a lower section and a vertically movable upper section mounted slidably adjacent said lower section; and means without said heavy liquid compartment and attached to said upper section for slidably raising and lowering said upper section of said second weir during continuous operation of said apparatus.

9. Apparatus for continuously separating substantially immiscible light and heavy liquids which is comprised of, in combination: a gravity separation compartment the downstream side of which is defined by a first weir of fixed height extending transversely across said compartment; a light liquid compartment positioned downstream from and adapted to receive light liquid from said gravity separation compartment; a heavy liquid compartment positioned downstream from and adapted to receive heavy liquid from said gravity separation compartment; a second weir of variable height defining the downstream side of and extending transversely across said heavy liquid compartment, said second weir having a lower section and a vertically movable upper section mounted slidably adjacent said lower section; a rod threaded at one end and attached to said upper section at the other end, said threaded end extending without said heavy liquid compartment through a threaded bonnet; and means for turning said rod in said bonnet so as to slidably raise and lower said upper section of said second weir during continuous operation of said apparatus.

References Cited in the file of this patent

UNITED STATES PATENTS

| | | |
|---|---|---|
| 368,544 | Morrison | Aug. 16, 1887 |
| 1,170,558 | Nonnenbruch | Feb. 8, 1916 |
| 1,513,882 | Bateman | Nov. 4, 1924 |
| 1,873,597 | Jones | Aug. 23, 1932 |
| 2,083,861 | Padgett | June 15, 1937 |